United States Patent Office 3,606,466
Patented Sept. 20, 1971

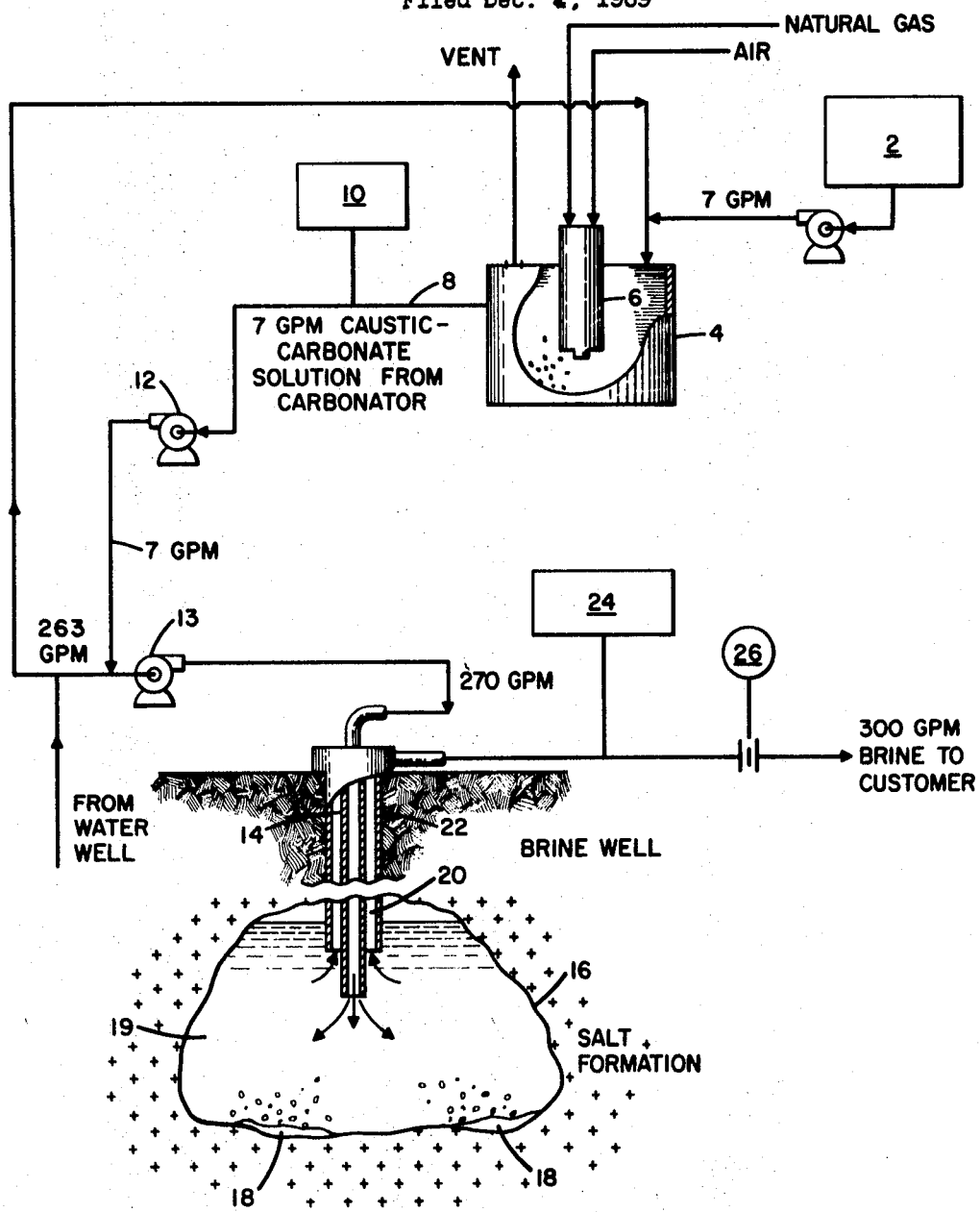

3,606,466
SUBTERRANEAN BRINE PURIFICATION
Dudley P. Fernandes, Ypsilanti, Mich., assignor to
Marathon Oil Company, Findlay, Ohio
Filed Dec. 4, 1969, Ser. No. 882,240
Int. Cl. E21b 43/28
U.S. Cl. 299—5                                   7 Claims

ABSTRACT OF THE DISCLOSURE

To remove impurities (largely calcium chloride and magnesium chloride) from brine recovered from the solution mining of sodium chloride deposits, alkali metal carbonate and alkali metal hydroxide are added to the water injected into the formation to dissolve the salt. The calcium carbonate and magnesium hydroxide thus formed will precipitate and settle within the salt cavity. Thickening agents or other coagulants can optionally be used to speed coagulation and settling.

BACKGROUND OF THE INVENTION

(1) Field of the invention

In the solution mining of salt, the brine removed from the underground cavity contains certain impurities that make it unsuitable for particular important uses, especially for subsequent chlorine production by electrolysis of NaCl brine. The impurities, largely alkaline earth metal chlorides such as $CaCl_2$ and $MgCl_2$ are commonly precipitated, settled and removed by filtration from the desired brine in large surface installations.

In addition to the large capital investment for such a surface installation, cost and difficulty of disposing of the brine sludge produced during the purification procedure has been steadily increasing in recent years, especially with growing emphasis on air and water pollution prevention.

In the petroleum industry, use of salt caverns for storage of hydrocarbons, especially LPG, is one of the cheaper methods of storing these hydrocarbons. However, development of these salt caverns by solution mining is becoming more difficult, especially in densely populated areas due to the difficulty of disposing of the brine removed from the cavity during its development. Very often disposal wells have to be drilled to get rid of this brine.

(2) Description of the prior art

U.S. Pat. 2,934,419 to Cook teaches treatment of sea water with a sodium hydroxide/sodium carbonate solution to precipitate magnesium hydroxide and calcium carbonate and to thereby adsorb trace elements, e.g. boron, iron, and aluminum, from the sea water on the precipitates for recovery.

In general, the present invention will produce a brine of such quality as to be more easily saleable and will concurrently eliminate the sludge disposal problems heretofore prevalent.

SUMMARY OF THE INVENTION

Briefly stated, the present invention provides for the production of substantially pure brine from alkali metal salt deposits containing alkaline earth metal salt impurities. Aqueous alkali metal carbonate and hydroxide are injected into the well during the solution mining process to form precipitates of alkaline earth metal carbonate and hydroxide which are allowed to settle within the salt cavity. Coagulation and settling of the precipitates may be enhanced by contact with a coagulant, herein defined. Brine of low impurity concentration is then withdrawn to the surface through producing means.

BRIEF DESCRIPTION OF THE DRAWING

The accompanying figure depicts a schematic process for producing purified brine from a salt formation penetrated by a well, shown in elevation view.

PREFERRED EMBODIMENTS

(1) The formation

In addition to recoverable alkali metal salts, the salt deposits to which this process is applicable generally contain alkaline earth metal salts, particularly salts of magnesium and calcium. Magnesium chloride and calcium chloride are the principal impurities to be removed. Other impurities include sulfates, such as calcium sulfate, bromides and iodides such as magnesium bromide, and various amounts of iodine and bromine. Although the principal alkali metal salt present is sodium chloride, other recoverable alkali metal salts are often found in the deposit, e.g. KCl, sodium borate and potash.

The salt formation is penetrated by at least one well providing fluid communication between the surface and subterranean formation. A series of two or more wells may be employed where underground communication between the wells has been established, so that one or more of the wells may be used as injection wells and likewise at least one producing well must be in fluid communication therewith. It is preferred to use a single well, preferably of the type used for recovering oil, gas, or water. In the solution mining of salt, there usually must be at least two tubing strings within the well, or one tubing string and a casing arranged to provide an annulus so that a circulating system is established between the surface and formation for injection of water and removal of brine. Generally, the inner tubing string can extend further into the formation than the outer string or casing. Water may be injected either through the inner string (withdrawing brine through the annulus) or alternatively injected through the annulus (withdrawing brine through the inner tubing). Those skilled in the art will be familiar with the general technique employed in the solution mining of salt and these techniques are understood to be within the techniques to be employed in the instant process. For instance, in some formations where formation stress is substantial, the generation of a spherical cavity to withstand the stress such as that taught in "Controlled Solution Mining in Massive Salt," Society of Petroleum Engineers, v. 6, No. 2, p. 115–126 (1966), may be desirable.

(2) Injecting fluids

In accordance with the present invention, the fluids to be injected include water, alkali metal carbonate, and alkali metal hydroxide. Although not narrowly critical, it is preferred to inject all three of these components simultaneously or nearly so. This enables direct contact of the subterranean salt deposits with the dissolving and precipitating agents to insure substantially complete removal of the alkaline earth meal impurities found in the salt deposits. The alkali metal carbonates are preferably selected from lithium carbonate, sodium carbonate, and potassium carbonate, with sodium carbonate being most preferred. The alkali metal hydroxides are preferably selected from lithium hydroxide, sodium hydroxide, and potassium hydroxide with sodium hydroxide being most preferred. The injection of aqueous alkali metal carbonate and alkali metal hydroxide may be accomplished by means of a pump which discharges into the suction of the water injection pump to the salt cavity. The exact amount of each for any solution mining project will depend on the impurity level in the salt layer. This impurity level must be carefully determined by sampling and analysis of salt taken from the the salt layer, and subsequently followed by periodic analyses of the brine produced. This is necessary in order to be able to keep the concentration of the precipitating reagents in the brine in the cavity in the following preferred ranges:

$Na_2CO_3$—200–1000 p.p.m. (based on salt in brine)
NaOH—50–500 p.p.m (based on salt in brine)

The more preferred ranges should be:

$Na_2CO_3$—200–400 p.p.m. (based on salt in brine)
NaOH—50–100 p.p.m. (based on salt inbrine)

The ranges of concentration of the precipitating solutions represent the excess over the individual amounts required to effect precipitation of the impurities in the brine.

Example.—This example illustrates calculation of injection rates for $Na_2CO_3$ and NaOH given a particular formation $CaCl_2$ and $MgCl_2$ impurity level based on brine assay.

| Brine impurity assay | p.p.m. (wt.) |
|---|---|
| $CaCl_2$ | 3000 |
| MgCl | 500 |

Brine rate (25% NaCl-wt.):

$$300 \text{ g.p.m.} = 432,000 \text{ g.p.d.}$$
$$= 4.32 \times 10^6 \text{ \#/day}$$

$Na_2CO_3$ for precipitation of $Ca^{++}$ as $CaCO_3$ $$= \frac{3000}{10^6} \times 4.32 \times 10^6 \times \frac{10^6}{111}$$

$$= 12,377 \text{ \#}Na_2CO_3/\text{day}$$

Excess required to insure proper precipitation of $Ca^{++}$ $$= 4.32 \times 10^6 \times \frac{50}{10^6}$$

$$= .216 \text{ \#/day } Na_2CO_3$$

Total $Na_2CO_3$ required/day $= 12,377 + 216$ $$= 12,593 \text{ \#/day}$$

NaOH required for precipitation of $Mg^{++}$ as $Mg(OH)_2$ $$= \frac{500}{10^6} \times 4.32 \times 10^6 \times \frac{80}{95.3}$$

$$= 1813 \text{ \#/day NaOH}$$

Excess required to insure proper precipitation of $Mg^{++}$ $$= 4.32 \times 10^6 \times \frac{25}{10^6}$$

$$= 108 \text{ \#/day NaOH}$$

Total NaOH required for precipitation of $Mg^{++}$ as $Mg(OH)_2$ $$= 1813 + 108$$
$$= 1921 \text{ \#/day}$$

The injected solution can be at ambient temperature or preferably in the range of 50 to 130 and, more preferably 60 to 100° F. Preheating, if desired to enhance the rate of dissolution within the formation, can be accomplished at the surface with a conventional heater or downhole with a submerged combustion heater, for instance. The injection pump pressure is not narrowly critical beyond the requirement that the pressure be sufficient to overcome the static head pressure within the particular well to allow injection of the precipitating solution into the formation. Preferred pressures are in the range of 200 to 1000 and more preferably 250 to 600 p.s.i.

After injection of water and treating chemicals into the salt layer has been started, the brine produced will be weak (10–20% NaCl by wt.) and cloudy. This cloudiness is caused by the presence of the unsettled $CaCO_3$ and $Mg(OH)_2$ precipitates. This will continue until the underground cavity has been increased in size so that a substantial residence time (preferably greater than 1 hour) is available (a) for complete solution of the salt in the water supplied, and (b) the settling of the precipitated impurities. As the underground cavity becomes larger an increasingly longer residence time insures saturation of the water supplied with salt (approximately 25% NaCl by wt. for instance) and complete settling of the precipitated impurities. The brine may be withdrawn by any known means, such as by suction pump. The principal control to be observed is to maintain the proper concentrations of the precipitating chemicals in the water injected into the cavity.

(3) Coagulating agents

Although not necessary, the rate of settling in the cavity may be enhanced by introducing any of a number of coagulants. Generally this will not be necessary. Preferred are the commercially available non-ionic, or anionic polyacrylamides, although any of a number of the normally employed coagulants may be used, especially trivalent salts, preferably aluminum and ferric salts, including $Al_2(SO_4)_3$, and $FeCl_3$. The most preferred coagulants are selected from the commercially available Dow NP Series (NP 10 or NP 30) or Hercules Reten A Series coagulants (Reten A 5). The preferred concentration of coagulant is preferably less than about 5 p.p.m. based on the weight of brine being produced, more preferably less than 2 p.p.m. and most preferably less than about 1.5 p.p.m. Use of a coagulant other than the most preferred polyacrylamides may necessitate higher coagulant concentrations. Although not entirely understood, it is believed that the coagulant enhances settling by causing an agglomeration of the slowly precipitating particles thereby causing rapid precipitation.

(4) Impurity level of produced brine

The brine produced will generally have less than about 12 p.p.m. magnesium ions and less than about 40 p.p.m. calcium ions based on salt in brine although usually less than about 5 p.p.m. and 20 p.p.m. respectively, making the brine suitable for immediate electrolysis in the production of chlorine without further purification at the surface. However, it may be desirable to run the brine effluent through a standard filter arrangement (sand filter) for removal of any suspended solids.

(5) Example

As an illustrative and non-limitative embodiment of the invention, referring to the figure, "cell liquor" from a chlorine plant comprising approximately 11% sodium hydroxide, 13% sodium chloride and 76% water by weight are pumped at a rate of 7 gallons per minute from cell liquor storage tank 2 to tank 4 containing submerged combustion carbonator 6. Assuming a salt reservoir composition containing 3,000 p.p.m. by weight of calcium chloride, and 500 p.p.m. by weight of magnesium chloride (obtained by core analysis), the amount of 100% sodium hydroxide needed is 11,160 lbs./day and the amount of carbon dioxide for production of sodium carbonate needed is 5,141 lbs./day. In tank 4, natural gas (58.3 s.c.f.m.) and air (558.3 s.c.f.m.) are charged to burner 6 to produce the necessary amount of carbon dioxide which is bubbled through the cell liquor tank 4 to produce a caustic-carbonate solution. This solution is withdrawn 8, analyzed in analyzer 10 and a controlled amount (7 g.p.m.) is pumped 12 into the suction of the water pump 13 to be combined with water (263 g.p.m.) for injection into the salt formation.

The aqueous caustic-carbonate solution is thoroughly mixed and injected through interior injection string 14 entering the salt formation and previously formed cavern 16 where salt is dissolved to form brine. Calcium carbonate and magnesium hydroxide precipitate and settle to the bottom of the cavern 18. The dissolution process takes place at the interior periphery of the cavern 16 forming a substantial body of brine 19 within the cavern which is pumped to the surface through annulus 20 formed between inlet string 14 and casing 22. The specific gravity of the effluent brine is measured in analyzer 24 to be 1.190–1.210 and contains less than 20 p.p.m. Ca$^{++}$ and less than 5 p.p.m. Mg$^{++}$ based on salt in brine. Flow recorder 26 measures the rate of flow of the brine, which is 300 gallons per minute.

While the invention has been described as a continuous process, it is clearly applicable to batch injection and production.

(6) Modifications

It should be understood that the invention is capable of a variety of modifications and variations which will become apparent to those skilled in the art by a reading of the specification and which are to be included within the spirit of the claims appended thereto.

What is claimed is:

1. In a process for the solution mining of water soluble alkali metal salts from subterranean deposits additionally containing water-soluble alkaline earth metal impurities, the improvement comprising:
   (a) injecting aqueous medium, alkali metal carbonate, and alkali metal hydroxide substantially simultaneously into said deposits,
   (b) dissolving at least a portion of said deposits to form a subterranean body of aqueous solution of substantial depth,
   (c) substantially simultaneously contacting the alkaline earth metal impurities with the alkali metal carbonates and hydroxides for a time sufficient to cause reaction therebetween and form insoluble alkaline earth metal carbonates and hydroxides,
   (d) maintaining at least a portion of said subterranean aqueous solution in a subtantially quiescent state for a period of time sufficient to cause settling of said insolubles,
   (e) withdrawing at least a portion of the aqueous solution of alkali metal salts remaining after said settling.

2. The process of claim 1 wherein settling of the insoluble impurities is enhanced by introducing a coagulant into the subterranean deposit.

3. The process of claim 2 wherein the coagulant is a polyacrylamide.

4. In the process of claim 1 wherein at least a substantial portion of the subterranean deposit, substantially to the exclusion of impurities, has been withdrawn from the underground formation whereby a cavern is formed, the step comprising:
   (f) injecting hydrocarbon into the cavern for storage purposes.

5. The process of claim 1 wherein the principal water soluble alkali metal salt is NaCl, the principal water soluble alkaline earth metal impurities are CaCl$_2$ and MgCl$_2$ so that the principal insolubles are CaCO$_3$ and Mg(OH)$_2$.

6. The process of claim 5 wherein the alkali metal carbonate injected is Na$_2$CO$_3$ and the alkali metal hydroxide injected is NaOH.

7. The process of claim 5 wherein settling of the insoluble impurities is enhanced by introducing a polyacrylamide coagulant into the subterranean deposit.

References Cited

UNITED STATES PATENTS

| | | | |
|---|---|---|---|
| 1,597,370 | 8/1926 | Freeth et al. | 23—42 |
| 2,994,200 | 8/1961 | Carpenter | 299—5X |
| 3,205,013 | 9/1965 | Miller et al. | 299—5 |

ERNEST R. PURSER, Primary Examiner

U.S. Cl. X.R.

23—42